United States Patent
Schantz

[19]

[11] 3,878,829
[45] Apr. 22, 1975

[54] BARBEQUE POST
[75] Inventor: John S. Schantz, Marine, Ill.
[73] Assignees: Raymond G. Schantz; Socrates J. Schantz, both of Marine, Ill. ; part interest to each
[22] Filed: July 5, 1974
[21] Appl. No.: 485,917

[52] U.S. Cl. ............................. 126/41 R; 126/25 R
[51] Int. Cl. ............................................. A47j 37/00
[58] Field of Search ................. 126/41 R, 25 R, 9 R

[56] References Cited
UNITED STATES PATENTS
| | | | |
|---|---|---|---|
| 3,386,432 | 6/1968 | Hanson | 126/41 R |
| 3,638,635 | 2/1972 | Dennan | 126/41 R |
| 3,688,758 | 9/1972 | Stephen | 126/41 R |

*Primary Examiner*—Edward G. Favors
*Attorney, Agent, or Firm*—Glenn K. Robbins

[57] ABSTRACT

A barbeque post for barbeque grills having split half tubular posts which are adapted to be bolted together and when so bolted form a clamp for a gas valve to the barbeque burner. The split post facilitates installation for gas lines and also provides specially designed brackets to clamp the valve. The post is designed for use in a portable or wheeled model as well as Permanent Post models such as Bell Posts, which are secured to a concrete floor or the like or straight posts which are imbedded in the ground with the latter two provisions having means for swivelling the barbeque pit upon the post. The portable model is provided with special flange connection means for connecting the post to the barbeque pit.

9 Claims, 10 Drawing Figures

STRAIGHT POST

3,878,829

PATENTED APR 22 1975

BARBEQUE POST

SUMMARY OF THE INVENTION

In the past various types of barbeque grills have been provided. Such barbeque grills as typified by my U.S. Pat. Nos. 3763846 and 3789822 have conventionally employed tubular support posts through which a gas line to the gas fired grill have been devised. Such tubular posts provide for interfitting of the gas line.

Difficulty has been encountered by the average home user who is required to set up the barbeque grill from unassembled parts in interfitting and supporting the various gas lines and valve fittings and the like. It will be appreciated that interfitting the various lines and parts through a closed tubular post requires a searching and time expenditure in aligning the various components for necessary support and connection.

By means of this invention there has been provided a split tubular post having a front half and back half with special clamping means when the two halves are connected together for clamping a valve in preselected position by means of V-shaped throats holding the valve together through upper and lower brackets provided on the two post halves. By means of the split post construction the user can simply assemble a gas line and electrical line in one half of the post since the entire inner portion is visible and readily accessible. Once interfitted the second half of the post is simply connected and clamped to the first half by connecting bolts or the like.

The split post construction of this invention lends itself to use in a so-called portable base model in which the post is supported upon a wheeled base. In this modification the upper part of the post is provided with inturned flange which fit through openings in the pit of the grill which are of a slot like construction making it possible when the tube halves are connected to firmly clamp the pit or grill housing to the post. In another modification a straight post construction is employed in which a long front half of the post may be embedded in concrete in a hole in the ground. After interfitting of the electrical and gas lines a shorter back half post standing at ground level is clamped to the front half to complete the post assembly.

Likewise a bell shaped post bottom can be employed for connecting the barbeque to a concrete base by bolting the bell shaped bottom to receiving holes in a concrete floor or the like.

In the straight post and bell post models means are provided for swivelling the barbeque housing upon the post. This is accomplished by means of a threaded adjustment knob fitting through a threaded hole in one of the post halves which bears against a cone shaped tube which is cast on the pit. The cone shaped tube fits loosely within the open top of the post and by loosening the adjustment screw the housing may be rotated to any desired position. The adjustment screw is then threaded into tightening or bearing relation against the cone shaped tube.

The barbeque post of this invention is simply designed through its split half construction and very readily receives the necessary gas and electric lines required. The clamping of the gas valve is very simply effected and a convenient means have been provided for assembly by the average home user for various types of installation whether they be for the bell post, straight post or portable base model. The construction is rugged and lends itself to convenient use.

The above features are objects of this invention and further objects will appear in the detailed description which follows and will otherwise apparent to those skilled in the art. For the purpose of illustration of of the invention there is shown in the accompanying drawings prefered embodiments thereof. It is to be understood that these drawings are for the purpose of illustration only and that the invention is not limited thereto.

In the drawings

FIG. 3, is an exploded view in front elevation of a barbeque using a bell post for mounting upon a concrete base of the like.

DESCRIPTION OF THE INVENTION

Figure 1:
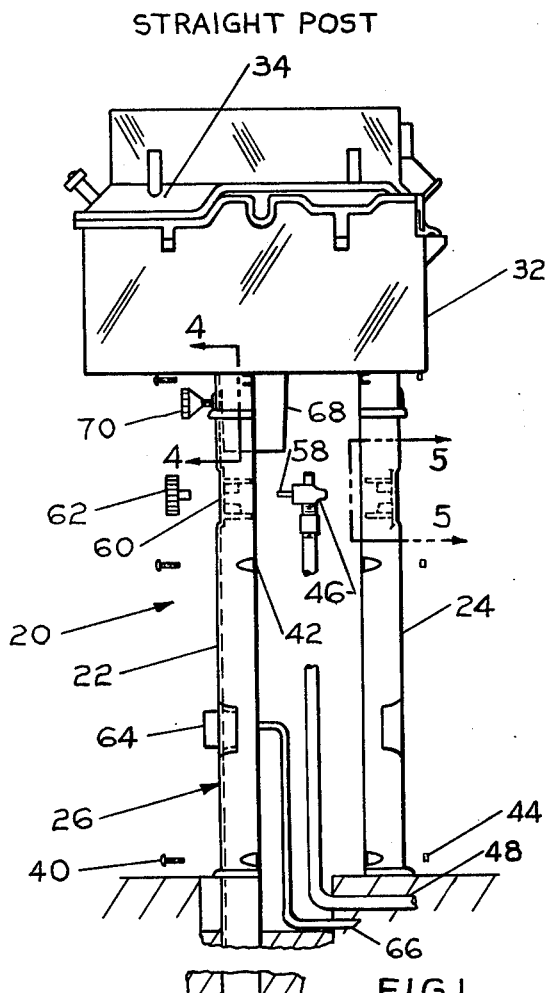
FIG. 1, is an exploded view in front elevation of a straight post barbeque.
Figure 2:
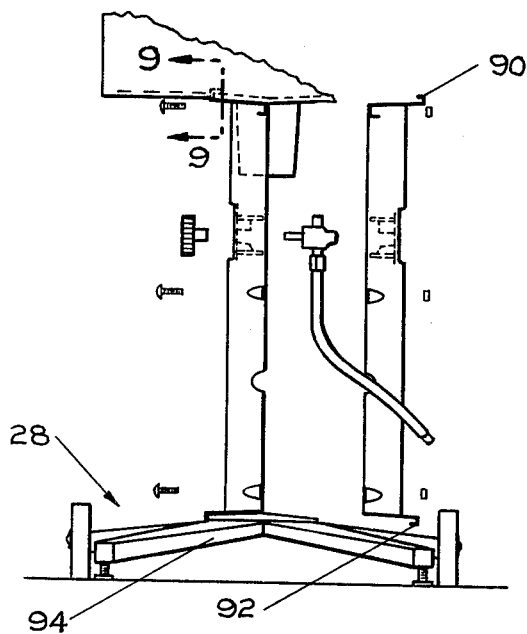
FIG. 2, is a fragmentary exploded view of a barbeque post used on a portable base barbeque.
Figure 3:
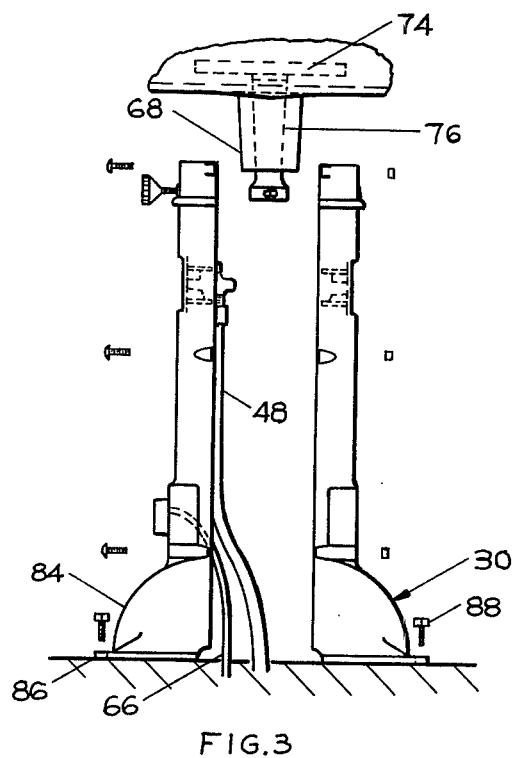

The split post support for the barbeque grill in this invention is generally identified by the reference numeral 20 in FIGS. 1, 2 and 3. It is comprised of a front half 22 and a back half 24 and is shown for use in FIG. 1, with a straight post design indicated by reference numeral 26, in FIG. 2, as a portable base design 28 and in FIG. 3, as bell post design 30. The barbeque post supports a barbeque pit 32 having a top, tripurpose lid 34 of the general construction as shown in my U.S. Pat. No. 3789822.

The barbeque post 20 shown in FIG. 1, has the front half 22 provided with an elongated bottom portion 36 which is adapted to be embedded in concrete 38. The front half post forms a half of a tube and is adapted to be connected together to the back half 24 which forms the other half of the split tubular support. Bolts 40 are adapted to be interfitted through holes 42 provided through flanges on the front and back halves of the post and secured by nuts 44.

Figure 5:
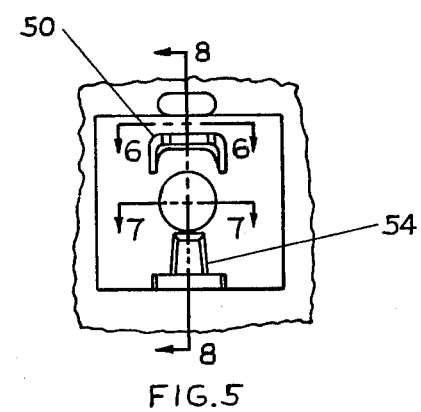
FIG. 5, is an enlarged view in section taken on the line 5—5 of FIG. 1.
Figure 6:
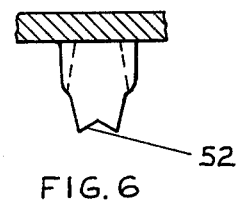
FIG. 6, is a view in section taken on the line of 6—6 of FIG. 5.
Figure 8:
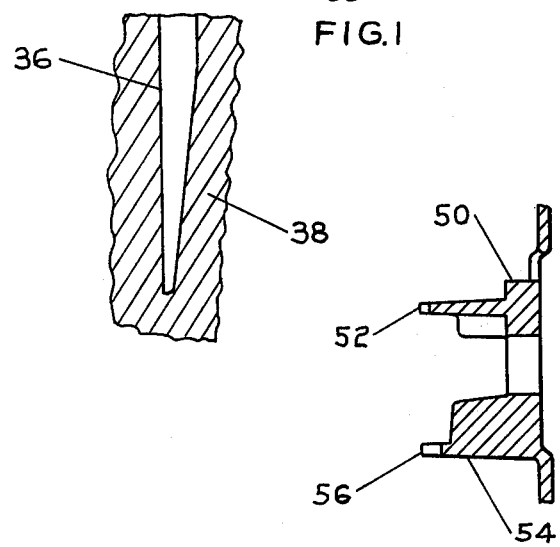
FIG. 8, is a view in section taken on the line of 8-8 of FIG. 5.
Figure 7:
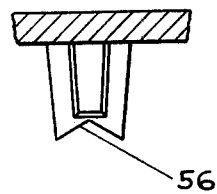
FIG. 7, is a view in section taken on the line of 7—7 of FIG. 5.

A gas valve 46 connected to a source of supply by a gas line 48 passing through the tubular post and underneath the back half section 24 is adapted to be secured by means of upper and lower brackets acting as clamps when the two half post are connected together. The upper post bracket designated by the reference numeral 50 in one half position is formed on both the front and back post half section. The bracket 50 as best shown in FIGS. 5, 6 and 8 has a V-shaped opening 52 which bears in clamping relation against the valve 46. A lower bracket 54 is formed likewise on both the front and rear post halves and has similar V-shaped opening 56 as best shown in FIGS. 5, 7 and 8. The valve has a shank 58 which fits through an opening 60 in the front post half and which receives a valve control knob 62.

At the lower portion of the front post half 22 there is formed a mounting to receive an outdoor weatherproof receptacle 64. This receptacle is connected to an electric line 66 which like the gas line leads underneath the rear post 24 to a source of electrical supply.

Figure 4:
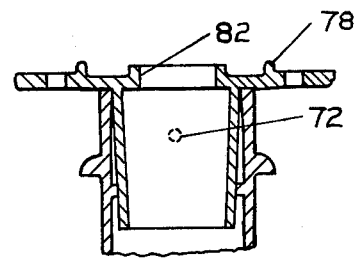
FIG. 4, is an enlarged view in section taken on the line 4—4 of FIG. 1.

The pit 32 has cast on the bottom of it, a cone shaped tube 68 which is in the form of a frusto conical member which is open at the bottom and is received within the open top half of the barbeque post. This construction is best shown in FIG. 4. A swivel control knob 70 connected to a threaded shaft fits through an opening 72 in the front half of the barbeque post and is adjustable so as to bear and lock in frictional engagement against the frusto conical tube 68. This construction provides for adjustment by the control knob when the barbeque pit is desired to be rotated from one direction to another and tightened or secured by tightening the adjustment knob 70 in the position desired.

Figure 10:
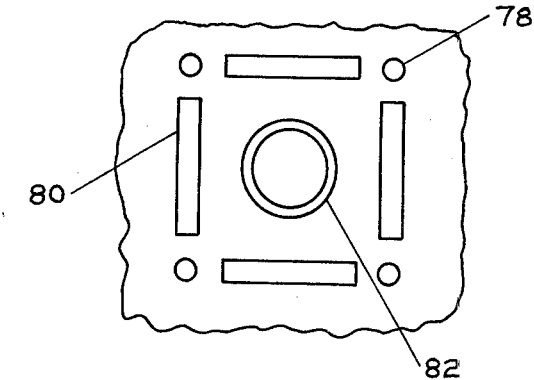
FIG. 10, is a fragmentary top plan view of the housing showing the floor of the pit construction.

The barbeque burner 74 is best shown in dotted lines in FIG. 3. It is connected to a downwardly depending burner venturi 76 which fits over the gas valve 46 as will readily understood by inspection of FIGS. 1 and 3. The construction of the barbeque pit and top of the post providing for swivel arrangement is identical for the modifications of both FIGS. 1 and 3. The burner 74 and venturi 76 can be withdrawn as a unit from the barbeque pit by simply raising the burner 74 through the frusto conical tube 68 thus providing for ready removal of the burner and venturi as desired for maintainence, cleaning and the like. The burner simply rests on the bottom of the pit which has short up-standing posts 78 supporting the burner slightly above the bottom of the pit and permitting the entry of air through slot like openings 80 formed in the bottom of the barbeque pit. The burner fits through the bottom of the housing through the opening 82 as shown in FIGS. 3, 4 and 10.

The bell post model 30 shown in FIG. 3, with regard to the upper portion of the post and the barbeque pit support for swivelling relation is identical in construction with that just described for the straight post model 26. However, instead of being supported in the ground in a concrete foundation the bottom of the split halves of the barbeque post are adapted to be bolted to a concrete floor or the like. This is accomplished by a bell shaped base 84 having flanges 86 through which bolts 88 may be secured to the floor. Thus by this modification the barbeque post may be simply connected to a flat base such as a concrete foundation, pad or the like.

Figure 9:
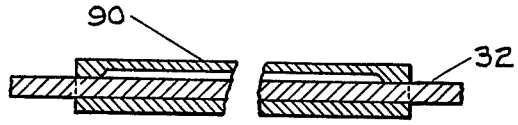
FIG. 9, is an enlarged view in section taken on the line 9—9 of FIG. 2.

The portable base model 28 shown in FIG. 2, does not require the swivelling relation since it can be moved on its wheeld base to any desired position. Accordingly the adjustment knob 70 is not needed and a firm connection of the top of the barbeque post of the bottom of the barbeque pit is provided by means of inturned flanges 90 formed on both the front and rear halves of the barbeque post. The flanges 90 interfit through opposed air slots 80 in the relation shown in FIGS. 2 and 9. When the two post halves are bolted together the flanges 90 are drawn together to clamp the floor of the barbeque pit in firm and securing locking engagement and likewise clamped on the wheeled base.

Use:

The straight post barbeque 26 is simply installed. A hole is first dug to receive the front half 22 which is inserted in the relationship shown in FIG. 1. This long half post is placed in the desired direction for the electrical outlet receptacle 64 and valve control knob employment. The hole is then filled with concrete slightly below the ground level and then straightened to be sure that it is plumb or vertical. After the concrete has set the valve 46 is placed against the throat of the bracket 50 and 54 with the shank 58 fitting through the front post. The control knob is then secured to the shank 58 to hold the valve in place. The gas and electrical connections are then secured. The remaining half post is then connected to the front post with the bolts and nuts 40 and 44 fitting through the flanged holes 42. The remainder of the hole is then filled with dirt to ground level.

The barbeque pit 32 is then simply inserted on top with the tube 68 fitting in the top of the barbeque post. The pit is turned to the desired direction and the adjustment knob 70 is tightened to lock the barbeque in place. The barbeque burner 74 is then simply fitted through the opening 82 of the pit and supported in a gravity rest position upon the posts 78 on the floor of the pit. The burner venturi in turn fits over the gas outlet in the top of the gas valve 46.

After the above installation the barbeque is ready for use and can simply be turned on by adjusting the gas valve control knob 62 to the desired flame setting. The electrical outlet 64 provides for reception of an electrical line for a motorized electrical rotisserie which can be used within the barbeque as desired or it can be used for lights or the like.

The bell post model is installed in a similar fashion to that described for the straight post model. However, instead of the hole installation the bell shaped base 84 is adapted to be simply bolted to a concrete floor or the like. The rest of the installation is similar to that described for the straight post model.

The portable base model 28 is likewise connected in a similar fashion to that described. However, before the rear half post is connected to the front half post the inturned flanges 90 on both the front and rear post are interfitted through the slot like openings in the bottom of the pit of the barbeque. Once inserted in this manner the post halves are secured together in so doing the top of the barbeque post is firmly locked to the bottom of the barbeque pit. The bottom of the front and rear post halves have similar inturned flanges which are connected to a support flange 92 positioned on the base 94 of the portable base model.

Various changes and modifications may be made within this invention as will be readily apparent to those skilled in the art. Such changes and modifications are within the scope in teaching of this invention as defined by the claims appended hereto.

What is claimed is:

1. A gas-fired barbeque having a barbeque pit and a support post said support post comprising a pair of axially split tubular post halves supporting said pit, said post halves having means for clamping together and opposed bracket members on the interior of each of said post halves engageable with a gas valve to hold it in clamped position when the post halves are clamped together.

2. The barbeque of claim 1, in which said bracket members have a V-shaped throat engageable in clamping relation with the gas valve.

3. The barbeque of claim 2, in which the valve has a valve adjustment shaft fittable through an opening in one of said post halves and engageable with a valve adjustment knob holding said valve in temporary support prior to being clamped in place when the other post half is engaged in clamping relation.

4. The barbeque of claim 1, in which pit adjustment means are provided to swivel said pit in a desired position, said adjustment means comprising an adjustment screw manually engageable from the exterior of said post to bear against a cone shaped tube connected to the bottom of said pit and depending downwardly in an open top of said support post.

5. The barbeque of claim 4, in which the tube has a downwardly tapering frusto conical configuration and is closely received in nesting relation within the open top of said support post to support the pit thereon.

6. The barbeque of claim 1, in which the pit has a floor having opposed slots therein, said post halves having opposed inturned flange members receivable within said slots and bearable against the edges thereof to lock the pit upon the top of the post when the post halves are clamped together.

7. The barbeque of claim 1, in which one half of the post is longer than the other half and is adapted to be supported within the ground and the other half is engageable with the first half at ground level to provide an area for a gas line and electrical plug-in connection through the bottom of the post to a source of gas and electric supply line.

8. The barbeque of claim 7, in which the longer half post receives a valve adjustment shaft through an opening, said shaft receiving a valve adjustment knob on the exterior of the post to hold said valve in temporary support prior to being clamped in place when the shorter post half is engaged in clamping relation.

9. The barbeque of claim 1, in which the lower ends of said half posts are provided with bell-shaped halves engageable together when the halves are connected said bell halves having flange means receiving anchoring bolts for anchrong to a floor, providing an area for a gas line and electrical plug-in through the bottom of the post to a source of gas and electric supply line.

* * * * *